United States Patent Office 2,890,178
Patented June 9, 1959

2,890,178

HYDROCARBON CONVERSION CATALYSTS

John P. Thorn, Elizabeth, and Walter R. F. Guyer, Roselle, N.J., assignors to Esso Research and Engineering Company, a corporation of Delaware No Drawing. Application October 14, 1953
Serial No. 386,122

13 Claims. (Cl. 252—455)

This invention relates to the preparation of catalysts for the conversion and treatment of hydrocarbons. More particularly, it relates to the preparation of improved catalysts comprising relatively small amounts of a metal or metal oxide deposited upon a suitable catalyst support. This application is a continuation-in-part of our co-pending application Serial No. 263,694, filed December 27, 1951, now abandoned.

The use of supported catalysts, particularly those containing a group VIII metal or a group V or VI metal oxide, has many known advantages in the treatment and conversion of hydrocarbons and hydrocarbon derivatives. The activity of such catalysts is in many respects related to the marked ability of these metals or oxides to cause a rupture or rearrangement of C—H or C—C bonds in a hydrocarbon molecule. Thus, they can be used in many known ways for the removal of hydrogen from organic compounds, resulting in some cases in simple dehydrogenation and in other cases in aromatization, cyclization, or other hydrocarbon coupling reactions. Or, the same catalysts can be employed with molecular hydrogen or with hydrogen derived from one of the above reactions or from an activated hydrocarbon residue to cause still other types of reactions to take place, including hydrogenation, hydrocracking, hydrofining, hydro-desulfurization, hydrogen transfer or isomerization reactions.

It has also been found that in many cases the character of the hydrocarbon reaction which will take place in the presence of a platinum-group metal- or group V or VI metal oxide-containing catalyst will be markedly affected by the character of the carrier upon which the active catalytic component is supported. It is entirely reasonable to suppose that in such cases both the active component and the catalyst support enter into the catalytic action. One constituent of the combined catalyst may cause the activation of reactant molecules or molecular fragments, which are then acted upon by another constituent of the catalyst to bring about the final transformation. Many such combined catalysts are known where neither the active component nor the catalyst carrier alone can bring about a particular type of transformation, which may be highly desirable. Such combinations or "multiple function" catalysts are particularly valuable in cases where they permit carrying out in a single step a catalytic transformation which might otherwise require several successive reactions or process stages.

A particularly useful combined action or synergistic effect of this type has been noted in the case of platinum or palladium catalysts, deposited upon an alumina-containing base. The exact character of the catalytic transformation which such catalysts will bring about is influenced to a considerable extent by the physical and chemical nature of the alumina-containing base. In general, however, it may be said that catalysts of this general type have important advantages in the refining of petroleum hydrocarbons in the naphtha boiling range for the preparation of products of improved motor fuel properties. Significant improvements are obtained in fuel performance as determined by octane ratings. Thus, normal paraffins of low octane number are isomerized to branched isomers and various naphthenic constituents are transformed to aromatics, all of which have improved anti-knock ratings. At the same time, the catalyst composition and operating conditions employed can be controlled so as to give a moderate increase in volatility. By this means the heavy naphtha stocks which tend to be of poorest octane quality can be brought down into the desirable motor fuel boiling range, at the same time that an improved fuel of high octane number is obtained.

One disadvantage of these catalysts is the fact that the noble metals which are their active components are expensive. An added disadvantage, however, is the fact that these catalysts tend to be so active that they can cause some constituents of the feed stock, which need only be present in trace amounts, to be transformed much more readily than others and carried so far as to result in the formation of coke deposits on the catalyst surface. While the formation of such carbonaceous or coke deposits is a known characteristic of many hydrocarbon conversion catalysts, in this case it is necessary to control very carefully the composition and operating conditions employed to avoid having a catalyst which is too active. For both these reasons, it has been found very advantageous to use only small amounts of the active metal, and catalysts having of the order of 0.01 to 1.0% platinum on the total alumina-containing base are preferred.

In general the activity of these catalysts is such that at low and moderately high pressures of the order of 50–1000 lbs. per sq. in., the reactions taking place at catalytic conversion temperatures of the order of 700°–1100° F. are properly characterized as hydroforming reactions, since they result in a net production or at least no net consumption of hydrogen. In the higher pressure part of this range, at operating pressures of about 400–1000 p.s.i.g., the reactions may be of such a nature that the formation of coke deposits on the catalyst surface is kept to a minimum. Under these conditions the catalyst can be used for long periods of time without regeneration. Also, however, under these high pressure conditions the reaction of hydrocracking, or cracking in the presence of hydrogen to form saturated hydrocarbons, is favored. For this reason when operating at high severities to obtain octane improvement, the volatilities of the hydroformed products are excessive. On the other hand, under low pressure hydroforming conditions, in the range of from about 50–300 p.s.i.g. operating pressure, this hydrocracking reaction is suppressed and the aromatization or dehydrogenation reaction is favored, so that higher octane number products are obtained which are characterized by reasonable volatilities.

While hydroforming operations with these catalysts in the low pressure hydroforming range result in the formation of a motor fuel of higher product quality, as indicated above, this is obtained at the expense of catalyst contamination with a carbonaceous deposit which must be removed in order to retain catalyst activity. Unfortunately, the stability of many of these highly active catalysts toward oxidative regeneration, which is the simplest way of removing such carbonaceous deposits, is very poor. This lack of stability, again, is apparently a property which is due partly to the catalytic metal, partly to the carrier, and partly to the combination between them.

The same type of combined action or synergistic effect of the active component and catalyst carrier has been noted in a number of other cases. In general, it applies to any supported catalyst when the carrier cooperates with the catalytic component beyond acting simply as a dispersing medium. In all such cases, the character of the support has a marked effect on the properties of the final catalyst. In the specific field of hydrogenation-dehydrogenation catalysts, for example, platinum or nickel supported on an adsorptive carrier such as charcoal, silica gel or active alumina frequently shows a marked difference in selectivity with respect to different types of hydrocarbon reactions, as well as on activity. Catalytic oxides such as molybdena, chromia, vanadia or cobalt molybdate behave very similarly in such combinations. Other carriers for the same catalysts serve essentially as inert spacing or dispersing agents, however, such as kieselguhr, pumice, and lime or a wide variety of nonhydrous metal oxides, and no such combined action appears. In most of such cases, the change from one inert carrier to another will have relatively little effect on catalyst activity, and whatever change does appear will depend primarily upon the degree of dispersion of the catalyst.

Heretofore, where a combined action of the catalyst and supporting material has been desired, it has been commonly recognized that the active catalytic component should be more or less uniformly impregnated on or distributed throughout the composite, so as to be intimately associated with each particle of the carrier. This has been particularly true for multiple function catalysts to be used in hydrocarbon conversions such as the hydroforming type of process discussed above, where many competing reactions are possible. Thus, for example, where it is important to develop means of preparing platinum catalysts on an alumina base which will have improved stability when regenerated with air or an oxygen-containing gas, or by other suitable means such as by hydrogenation, this regeneration stability was applied to the combination of the catalyst with each particle of the carrier, as well as to the carrier itself.

In direct contrast to this procedure, it has now been found that multiple function catalysts of very desirable properties can be prepared to advantage by a simple new method, whereby the catalytic component is associated with a minor amount of finely divided particles of an adsorptive carrier and diluted with a major amount of fine particles of an adsorptive carrier, to form the final composite. The active component in this case is not only added in this way, but remains so throughout the use of the catalyst, so that separate functions of the catalyst-carrier association and of the diluent adsorbtive material can be separately promoted. The active component is thus distributed effectively throughout the final composite in discrete particles which are not directly associated with the diluent adsorptive material which forms the bulk of the catalyst mass.

It is an object of the present invention to prepare a multiple function catalyst whose activity depends upon the combined action of an active component and an adsorptive diluent, wherein the active component is present in discrete particles which form a minor part of the catalyst composite and the bulk of coacting adsorptive material is present as diluent particles substantially free of the active component.

It is a further object to prepare such catalysts by a simple method of preparation which gives effective distribution of the active component throughout the catalyst mass.

It is another object of the present invention to prepare a noble metal on alumina base catalyst of improved regeneration stability.

A still further object is to prepare an active catalyst containing a low concentration of platinum on an alumina base in which there is first prepared an intermediate concentrate of platinum on the alumina which is subsequently diluted with the alumina alone to give a final catalyst of the desired average composition and improved stability.

According to the present invention, noble metal catalysts of improved stability toward oxidative regeneration are obtained when the platinum or other metal to be composited with an alumina-containing catalyst base is first added to a relatively small amount of a suitable base in such a way as to prepare an intermediate concentrate of high catalytic metal concentration. This concentrate, which may be prepared by various means, is diluted in the dry form with the additional amount of catalyst carrier or an alternate catalyst constituent required for the final preparation and the final mixed catalyst is then heat treated and reduced with hydrogen as may be desired before use.

The catalyst base or carrier used for the preparation of the intermediate concentrate may or may not be the same as the diluent base used as the major component of the final catalyst. Advantages have been found in both types of preparations. Particularly useful results with the noble metal catalysts, as with hydrogenation-dehydrogenation type catalysts in general, have been found when the diluent base is an alumina-containing adsorbent or active material in which the alumina is a major component. This alumina may be prepared by a variety of methods, and may be separately promoted or stabilized in various known ways, as by the addition of silica, boria, phosphoric anhydride, zirconia, thoria, or holagen acids. These or other addition agents may be employed separately or in combination, to promote various types of catalytic conversions for which they are known in the art.

The carrier used for the intermediate concentrate may be any of the above, but can also be one of a variety of other materials. Thus, it may be a form of alumina promoted or modified with one or more of the oxides of magnesium, calcium, zinc, or potassium. It may also be composed entirely of other materials, such as zirconia, titania, magnesia, or activated carbon or the like.

Both the diluent base and the concentrate carrier in a multiple function catalyst of the type here described will be an adsorptive material. Thus, a catalyst having the average composition of 5% platinum or activated charcoal might be made up from one part of a concentrate, containing 25% Pt, to four parts Pt-free diluent. The diluent char particles could then contain a promoter entirely apart from the Pt-containing particles, say 1% of an alkali such as sodium carbonate added to cut down on the cracking activity of the base. The same principles apply whether active alumina, silica gel, activated carbon or some other suitable adsorptive material is used as the diluent.

Active aluminas which may be used as a part or all of the support for catalysts prepared in accordance with the present invention are well known in the art, and may be readily purchased commercially. Specific activated aluminas and an alpha alumina or corundum which have been studied in the preparation of these catalysts are the following grades of Alorco alumina manufactured and sold by the Aluminum Company of America:

TABLE I

| Alorco Grade | F-10 | H-41 | H-42 | T-75 |
| --- | --- | --- | --- | --- |
| Surface Area, m.$^2$/g | 90–125 | 200–300 | (*) | 0.3–0.1 |
| Pore Size, Angstroms | 40 | 30 | (*) | |
| Porosity, Percent | 35 | 50 | 50 | 16–20 |
| Approximate Chemical Analysis, Wt. Percent: | | | | |
| Al$_2$O$_3$ | 96 | 90 | 70+ | 99.5 |
| SiO | 0.1 | 5.5 | 4.3 | 0.02 |
| Na$_2$O | 0.1 | 0.1 | 0.06 | 0.05 |
| Fe$_2$O$_3$ | 0.05 | 0.12 | 0.03 | |
| Loss on Ignition at 950° F | 3.0 | 8.5 | *25 | nil |

*Undried material.

It will be understood that the activated aluminas H-41, H-42 and F-10 are merely typical and that other active aluminas of commerce can also be employed.

An activated alumina may be used as received or is preferably given a preliminary drying at temperatures of 200°–250° F. for from about 2 to 24 hours. The predried alumina is then mixed with a solution of a suitable platinum or palladium salt such as chloroplatinic acid or palladium chloride. The concentration of the impregnating solution and the amount used can be so chosen that a relatively thick paste is formed when mixed with the activated alumina or the platinum or palladium can be adsorbed upon the alumina from very dilute solutions. The amount of chloroplatinic acid or palladium chloride added is somewhat variable depending upon the activity desired in the final catalyst.

As a general rule, sufficient chloroplatinic acid is incorporated to leave about 0.01 to 2.0 wt. percent of platinum in the finished catalyst and sufficient palladium chloride is incorporated to leave from 0.05 to 5.0 wt. percent of palladium in the finished catalyst. The same general method of preparation can also be employed in making up the platinum concentrate used according to the present invention.

The principle can be extended theoretically to the use of any concentrate having an amount of active component higher than that to be found in the finished preparation, up to and including the addition of the impregnating compound in dry, undiluted form directly to the total amount of carrier. With platinum catalysts it has been found preferable, however, to use the intermediate concentrate, particularly since chloroplatinic acid, the most readily available form of platinum, is hygroscopic. The preparation of the intermediate concentrate makes this material easier to handle and also somewhat easier to disperse physically, throughout the carrier. The maximum concentration which can be conveniently obtained by the simple method of impregnation from aqueous solution is about 35 wt. percent, although higher amounts can be incorporated in the intermediate concentrate, if desired, by the principle of dry admixture.

The impregnated alumina, which would be the finished catalyst in the general method of preparation or the concentrate according to the present invention, is then dried before further handling. The dried concentrate may then be mixed directly with the diluent carrier material, or it may be partly or completely reduced and calcined before this admixture. In either case, the catalyst is finally dried in air at temperatures from 100° up to 700° F. and slowly calcined at temperatures up to 900°–1000° F. Alternatively, the mixture of dried materials may be reduced with high flow rates of hydrogen while slowly heating the same from room temperature to temperatures of 900°–1000° F. It is preferable in using this procedure to reduce the catalyst in the hydroforming unit by means of a stream of hydrogen or hydrogen-rich gas while raising the temperature slowly, for example 50–75° F. per hour. Somewhat slower or faster rates of heating may be employed. It is also possible to activate the catalyst by calcination of the catalyst in air but slow and carefully controlled rates of heating must be employed to avoid deactivation.

Specific examples of catalysts prepared according to this invention are shown in the following:

EXAMPLE I

The standard reference catalyst for this series of tests is an 0.5% Pt on H–41 alumina prepared by the impregnation of dilute aqueous chloroplatinic acid on the pre-dried base. In a standard preparation, 1000 g. of H–41 $Al_2O_3$ pre-dried overnight at 250° F. is treated with 125 cc. of a 10% $H_2PtCl_6$ solution diluted to 900 cc. with water. The material is mixed well, dried at room temperature and further dried overnight at 250° F. The catalyst is then pilled, ready for reduction in the unit and testing. This preparation will be referred to as catalyst (1) in the following discussion.

For the preparation of the intermediate concentrate in this example, 1000 grams of Alorco H–41 alumina predried at 250° F. was impregnated with 850 cc. of an aqueous solution containing 131 grams of chloroplatinic acid, dried first for 24 hours at room temperature and then overnight at 250° F. A portion of this catalyst, containing 5% Pt on alumina, was retained for further testing.

Seventy grams of the catalyst concentrate thus prepared was intimately mixed with 630 grams of H–41 alumina and pilled for testing. The concentrate (2) and the final catalyst (3) thus prepared represent concentrations of 5.0 and 0.5 wt. percent of platinum respectively, based upon the total alumina employed in their preparation. The activity and stability of these two catalysts in a standard hydroforming test was compared with that of the standard preparation (1).

In this test procedure a 200 to 330° F. heavy virgin naphtha is hydroformed over the pilled catalyst in a fixed bed for four hours at 200 lbs. pressure at 900° F. and a hydrogen feed rate of about 6000 standard cu. ft. per barrel of feed. This period is followed by a 2–4 hour oxidative regeneration period at atmospheric pressure and 900°–950° F. maximum temperature starting with a gas containing 1% oxygen concentration and gradually increasing to a final 20% oxygen concentration in the regeneration vent gas. The stability of the catalyst is measured in terms of the rate of Octane Number loss per operating cycle, which varies with the feed rate. The best catalysts from the viewpoint of stability are obviously those in which this loss in activity is kept as low as possible.

TABLE II

| Catalyst | Pt Content, g./1,000 g. of Catalyst | Feed Rate, w./hr./w. | O.N. (Clear) Research Total Liquid | Regeneration Stability, Percent of Reference |
|---|---|---|---|---|
| (1) 0.5% Pt on H–41, reference | 5 | 1 | 90–95 | 100 |
| (2) 5% Pt on H–41 | 50 | 2 | 96 | 175 |
| (3) 10% of 5% Pt + 90% H–41 | 5 | 1 | 94 | 175 |

These data show that the catalyst of the present invention (3) prepared via the intermediate concentrate (2) gives a very good activity, approaching that of the 5% concentrate. It may be noted in this connection that catalyst (2) tends to be overactive, giving large heat effects and excessive hydrocracking. The stability of catalyst (3) is also correspondingly improved and these results are obtained without any increase in the total amount of platinum in the catalyst compared to that of the standard reference example.

EXAMPLE II

A concentrate corresponding to 5 wt. percent of platinum on alumina was prepared in the same manner as catalyst (2) described above and 100 grams of this material was dried at room temperature, further dried at 250° F. for 16 hours, and then reduced overnight in a stream of hydrogen. The reduction temperature was increased gradually from 250° to 900° F. over a period of seven hours, and held at 900° F., for a total of 22 hours. The finished 5% catalyst prepared in this way was cooled to room temperature and combined with 900 grams of pre-dried H–41 alumina. The combined catalyst was mixed thoroughly by passing through a Braun pulverizer, then pilled and submitted for evaluation by the test procedure. This catalyst (4) was found to have high activity, giving a product of 94 Research octane number clear with good catalyst stability.

The test results on this pre-reduced concentrate preparation (4) are shown in Table III, where they may be compared with the catalysts of Example I.

TABLE III
*Concentrate and diluent both active alumina*

| Catalyst | 1 | 2 | 3 | 4 | | 5 | | 6 | | 7 | | 8 | |
|---|---|---|---|---|---|---|---|---|---|---|---|---|---|
| Run No | 40,840 | 251 | 255 | 431 | | 435 | | 434 | | 432 | | 433 | |
| Platinum Carrier | H41 | H41 | H41 | H41 | | H41 | | H41 | | H41 | | H41 | |
| Pt content, wt. Percent | 0.5 | 5 | 5 | 5 | | 33⅓ | | 33⅓ | | 5 | | 5 | |
| Parts, per 100 total cat | 100 | 100 | 10 | 10 | | 1.5 | | 1.5 | | 10 | | 10 | |
| Diluent Catalyst | | | H41 | H41 | | H41 | | H41 | | H41 | | H41 | |
| Parts, per 100 total cat | | | 90 | 90 | | 98.5 | | 98.5 | | 90 | | 90 | |
| Notes: Pt reduced before mixing | No | No | No | Yes | | No | | Yes | | Pills, Yes | | Pills, No | |
| Operating Conditions: | | | | | | | | | | | | | |
| Temperature, °F | 897 | 900 | 900 | 887 | 901 | 896 | 897 | 902 | 908 | 902 | 902 | 906 | 902 |
| Pressure, p.s.i.g | 200 | 200 | 200 | 200 | 200 | 200 | 200 | 200 | 200 | 200 | 200 | 200 | 200 |
| H₂/HC Mole Ratio | 6 | 6 | 6 | 6 | 6 | 6 | 6 | 6 | 6 | 6 | 6 | 6 | 6 |
| Feedrate, V./V./Hr | 1 | 2.4 | 1.2 | 2 | 1 | 2 | 1 | 2 | 1 | 2 | 1 | 2 | 1 |
| Period Length, Hours | 2 | 4 | 4 | 1.5 | 2.0 | 1.5 | 2.0 | 1.5 | 2.0 | 1.5 | 2.0 | 1.5 | 2.0 |
| Unit Condensate: | | | | | | | | | | | | | |
| Research O.N., Clear | 95.1 | 96.3 | 93.8 | 82.9 | 94.3 | 85.7 | 87.6 | 85.1 | 86.3 | 77.3 | 76.3 | 76.3 | 75.9 |
| Reid V.P., pounds | 6 | | 9 | 4.5 | 13.0 | | | | | 4.5 | | | |

Taxing into consideration the effect of feed rate, the pre-reduced catalyst approaches closely the activity of the initial preparation (3) where the concentrate was mixed with the diluent base before reduction.

A physical comparison of catalysts (3) and (4) is also instructive as to the character of the catalysts prepared by this new method of manufacture. Alumina particles impregnated by conventional means with a small amount of platinum, even a fraction of a percent, take on a definite black or gray-black color after the initial reduction. Visual inspection of the catalysts of the present invention under a microscope shows by contrast, an intimate mixture of black metal-containing particles with a much larger proportion of white metal-free particles. This appearance is the same for catalyst (3) after reduction and use as for catalyst (4). This and the fact that the activity of catalyst (4) is entirely comparable to that of catalyst (3) proves that the development of this activity requires no significant transfer of active metal from the concentrate portion to the diluent adsorbtive material, either before or after the original impregnating salt is reduced to the metal form.

EXAMPLE III

In this case an intermediate concentrate of high platinum content was prepared by impregnating 10 grams of H-41 alumina with 12.5 grams of chloroplatinic acid diluted to 8 cc. of solution in distilled water. These quantities correspond to 5 grams of platinum or 33% concentrate. An 11.7 gram portion of the concentrate thus prepared containing 2.5 g. of platinum was diluted with 490 grams of pre-dried H-41 alumina. This material was thoroughly mixed, pilled and tested as described above. This catalyst, number (5) in Table III, was found to show good activity and stability with a product octane number of 88.

A companion catalyst (6) using a pre-reduced concentrate was also prepared. In this case 11.7 g. of the 33% Pt concentrate was reduced for a total of 22 hours as in Example II, finishing at 950° F. This material was then mixed with 490 g. of H-41 alumina, pilled and evaluated. In this case as in Examle II, the pre-reduced concentrate gives a catalyst of nearly the same activity as where the catalyst is reduced after mixing.

EXAMPLE IV

The importance of intimate mixing of the concentrate and the diluent base is shown by data obtained using mixed discrete pills of the concentrate and the diluent alumina, in the same total proportion as that of the above mixed catalysts. Data are shown in Table III for catalyst (7), in which 50 cc. of the 5% Pt concentrate pills (catalyst 2) were mixed with 450 cc. of H-41 pills and charged to the unit. Catalyst (8) consists of the same proportions, where the concentrate pills were pre-reduced before mixing and placing in the test unit. Both these catalysts show only mediocre results, indicating that intimate mixing is important regardless of whether or not the impregnated concentrate is reduced beforehand.

TABLE IV
*Carriers other than active alumina*

| Catalyst | 9 | 10 | 11 | | 12 | | 13 | | 14 | |
|---|---|---|---|---|---|---|---|---|---|---|
| Run No | 430 | 490 | 572 | | 246 | | 451 | | 248 | |
| Platinum Carrier | T75 | H41 | ZnO.Al₂O₃ | | ZnO.Al₂O₃ | | TiO₂ | | TiO₂ | |
| Pt content, wt. Percent | 0.5 | 5 | 0.5 | | 5 | | 0.5 | | 5 | |
| Parts, per 100 total cat | 100 | 10 | 100 | | 10 | | 100 | | 10 | |
| Diluent Catalyst | | T75 | | | H41 | | | | H41 | |
| Parts, per 100 total cat | | 90 | | | 90 | | | | 90 | |
| Notes: Pt reduced before mixing | No | No | No | | No | | No | | No | |
| Operating Conditions: | | | | | | | | | | |
| Temperature °F | 894 | 895 | 918 | 897 | 902 | 900 | 899 | 905 | 908 | 901 | 902 |
| Pressure, p.s.i.g | 200 | 200 | 200 | 200 | 200 | 200 | 200 | 200 | 200 | 200 | 200 |
| H₂/HC Mole Ratio | 6 | 6 | 6 | 6 | 6 | 6 | 6 | 6 | 6 | 6 | 6 |
| Feedrate, V./V./Hr | 2 | 1 | 1.3 | 2 | 1 | 2 | 1 | 2 | 1 | 2 | 1 |
| Period Length, Hours | 1.5 | 2.0 | 2.0 | 1.5 | 2.0 | 1.5 | 2.0 | 1.5 | 2.0 | 1.5 | 2.0 |
| Unit Condensate: | | | | | | | | | | | |
| Research O.N., Clear | 66.1 | 66.8 | 78.7 | 71.2 | 81.7 | 88.5 | 90.4 | 75.3 | 65.8 | 90.2 | 91.4 |
| Reid V.P., pounds | 2.4 | 2.6 | 4.8 | 3.8 | 5.9 | 5.7 | 5.9 | 5.6 | 3.5 | 5.7 | 2.7 |

The above examples give specific details for the production of an improved catalyst according to the present invention where both the concentrate base and the diluent base are forms of active alumina. While certain of the steps are essential for producing the improved catalyst, certain of the conditions may be varied and need not be exactly restricted to those given in the examples. For example, pre-drying of the ground activated alumina may be at 212° F. to 950° F. and even to 1400° F. for 2 to 24 hours, the shorter times being used at the higher temperatures. In the impregnation step the mixing of the dilute chloroplatinic acid solution together with the dried, ground alumina or other carrier may be continued for about ten minutes to about one hour, while adding water, if necessary, to maintain a pasty condition of the mixture but excessive water addition is to be avoided. The paste may be allowed to stand at room temperature from about 2 hours to 24 hours. The paste may then be slowly dried at a temperature of about 212° F. to 400° F. for about 8 hours to 24 hours, the shorter times applying to the higher temperatures.

For preparing catalysts containing larger amounts of platinum, larger amounts of chloroplatinic acid are used. For all of these preparations, the amount of platinum in the finished catalyst is preferably between about 0.01% and 1.0% by weight but in some cases may be as high as 2.0%. Also, while chloroplatinic acid has been used here as a readily available soluble salt of platinum, other soluble platinum salts may be used to advantage in the same general method of preparation.

Where alumina is used it may be, as indicated above, a relatively pure form of active alumina such as the F–10 grade described. Pure active aluminas prepared by a variety of other techniques, including preparations by way of an alumina sol or alumina precipitated or co-precipitated or otherwise mixed with various addition agents may also be employed. Particularly useful results are obtained with active aluminas containing controlled small amounts of silica, usually from about 1 to 11% of $SiO_2$, and the H–41 grade described is a material of this type. Other carriers may be used in the same way, as indicated above, particularly such absorptive materials as the acidic oxide gels or oxide complexes such as $SiO_2/Al_2O_3$, $B_2O_3/Al_2O_3$, $SiO_2/MgO$, $SiO_2/ThO_2$, and the like. Also, in order to control the selectivity and activity, it may prove advantageous in certain cases to employ basic promoters or modifiers in connection with the active metal concentrate, which if added to the overall catalyst would interfere with the action of the acidic oxide. The use of calcium oxide, potassium or sodium carbonate to repress cracking activity of the carrier serves as specific examples of such action.

Additional catalysts prepared by this technique have been tested, as shown in Table IV, where constituents other than active alumina have been used as bases for the concentrate or for the dilution. These results show, in general, that for Pt catalysts the use of active alumina or an alumina-containing material as the diluent material is advantageous, but that it is not necessary for the concentrate base. Indeed, superior catalysts are obtained in certain cases by employing, in the concentrate, bases which do not give useful results when employed as the sole carrier for catalysts of the same final platinum content.

EXAMPLE V

A catalyst (9) comprising 0.5 weight percent Pt on alumina was prepared using a form of alpha alumina or corundum instead of active alumina. For this preparation 1000 g. of Alorco T–75 tabular alumina (see Table I) was impregnated with 125 cc. of 10% $H_2PtCl_6$ stock solution, dried and tested. The catalyst gave poor results, with a product of only 67 O.N.

Another catalyst (10) using the same base was then prepared by adding 60 g. of 5% Pt on alumina powder (catalyst 2) to 540 g. of T–75 alumina. The material was intimately mixed by regrinding, dried and tested. While the octane number in this case was only mediocre, being 79, this represents a significant improvement over the results obtained with catalyst (9) where the T–75 base was used alone.

EXAMPLE VI

A zinc aluminate base was prepared by mixing a solution of 23 kg. of zinc sulfate and 4 liters of concentrated sulfuric acid in 110 liters of water with a filtered solution containing 27 kg. of sodium aluminate and 3.2 kg. of NaOH in 110 liters of water. The resulting precipitate of zinc aluminate was filtered, washed on the filter press, and dried at 400° F.

A catalyst (11) consisting of 0.5 weight percent of Pt on zinc aluminate was prepared impregnating 600 g. of the above dried precipitate with 75 cc. of 10% stock $H_2PtCl_6$ solution diluted to 800 cc. with distilled water. The resultant paste was dried at room temperature and at 250° F., and pilled for testing.

The companion catalyst (12) was prepared by first making a 5% Pt concentrate on the zinc aluminate. Here 12.5 g. of chloroplatinic acid crystals (40% Pt) were dissolved in 80 cc. of distilled water, added to the base and mixed thoroughly into a paste. This paste was dried at room temperature and at 250° F., and added to 900 g. of H–41 alumina pre-dried at 650° F. The material was mixed by regrinding, and formed into 1200 cc. of catalyst pills for testing.

In this case the zinc aluminate base alone was not a good carrier, but the catalyst 12 using H–41 as the diluent and zinc aluminate as the carrier for the concentrate shows quite good activity.

EXAMPLE VII

A similar comparison shows even more striking results when using an activated titania as the carrier. An 0.5% Pt catalyst (13) on titania from titanium hydroxide was prepared by the same impregnation method described above. This catalyst gave some slight activity but very poor stability, indicated by a loss in product octane instead of the usual gain in the second operating period at the lower feed rate of 1 v./v./hr., as shown in Table IV. The same titania used as a base for a 5% concentrate, diluted as before 10 parts to 90 parts of H–41 alumina, gave a catalyst (14) of excellent initial activity by comparison, and of good stability.

The application of the intermediate concentrate technique to catalysts having an active component other than a platinum-group metal has also been tested and found beneficial, as shown in Table V. Here again, while the invention is not limited to the use of alumina-containing carriers, it is especially well suited to such use. This is particularly true for hydrocarbon conversions using multiple function catalysts where hydrogenation-dehydrogenation reactions are involved. Thus, among the group V–VI metal oxides and other group VIII metals catalysts comprising chromia, vanadia, nickel, tungsten, as well as molybdena or cobalt molybdate are all found to have excellent properties when supported on an alumina base. With any of these, as with platinum or palladium, the intermediate concentrate method permits using a base for the active component having different physical or chemical properties from those of the diluent base.

EXAMPLE VIII

A reference catalyst (15) containing 10% molybdena on alumina was prepared by dry mixing for 1 hour in a Hobart mixer an H–41 alumina powder previously calcined for 3 hours at 1200° F. together with 10% of acid molybdic C.P. by weight on the total mixture. This mixture was calcined for 3 hours at 1400° F., and pilled for testing as catalyst (15).

In preparing catalyst (16), 600 g. of 10% molybdena powder prepared as described above for catalyst (15) was dry mixed with an additional 65 g. of acid molybdic C.P. and calcined further for 3 hours at 1400° F. A 325 g. portion of this concentrate, consisting of 20% molybdena on alumina, was then dry mixed for 30 minutes in the Hobart mixed with 325 g. of diluent Alorco H–42 alumina which had been calcined at 850° F. This mixture was pilled for testing as catalyst (16).

These catalysts were compared by standard hydroforming test runs, feeding a 200 to 330° F. heavy virgin naphtha for 4 hours at 200 lbs. pressure at 900° F. together with hydrogen at the rate of about 2000 standard cu. ft. per barrel of feed. The test data results are shown in Table V.

TABLE V

*Nominal 10% molybdena on alumina*

| Catalyst | Composition | Comparison at 95 Res. O.N. Level ||
|---|---|---|---|
| | | $C_5+$ Yield, Vol. Percent | Activity, W./hr./W. |
| (15) | 10% $MoO_3$ on H-41 | 77 | 0.7 |
| (16) | 50 parts H-42 plus 50 (20 $MoO_3$:80 H-41). | 76 | 1.0 |

The intermediate concentrate catalyst (16) shows no significant difference in selectivity from the reference dry mix catalyst (15), in terms of $C_5+$ yield at the 95 octane level. There is a slight activity advantage for the concentrate catalyst, shown by the higher feed rate which can be used at this quality level (w./hr./w. equals pounds of oil per hour per pound of catalyst in the reactor).

While the above data show results obtained in fixed bed tests, it will be understood that the results of this invention have particular advantages when applied to fluidized solids techniques. In either case, the catalyst concentrate particles are intimately mixed with the catalyst-free diluent particles before use. The high degree of mixing and turbulence which characterize fluid bed operation offer a definite advantage, which can be appreciated by comparing the results of Example I and Example IV. This technique also makes it possible to prepare a fresh catalyst in this manner by adding the desired amount of concentrate to a fluid bed of suitably treated base. The same principle can be applied to supplying additional amounts of the active component where this may be desired for catalyst make-up, or to increase the activity of a partly spent catalyst. It will also be seen from the above data that concentrates of widely varying composition can be employed in this way to advantage.

In the examples given above, particular attention has been paid to the fact that the diluent base may differ advantageously from the concentrate carrier in chemical or physical composition, or in the presence or absence of certain promoters. It will also be appreciated that these two portions of the adsorptive material present may also differ advantageously in other properties such as cost or particle size. Thus, where the loss of valuable platinum in dust or fines might be a serious factor with certain alumina bases of high activity and only fair attrition resistance, the platinum may be put on a harder or slightly larger size finely divided concentrate carrier, even if this is more expensive than the bulk of the diluent alumina. The fines lost, either through attrition or through normal entrainment, will then tend to contain much less of the precious metal than an aliquot of the total catalyst composition.

For hydroforming operations using the new platinum-containing catalysts prepared according to the present invention the temperature may be between about 600° F. and 1000° F., preferably 800° F. to 950° F., the pressure, atmospheric to about 1000 lbs. per square inch, the naptha feed rate about 0.25–10 v./v./hr. (volume of liquid feed per volume of catalyst per hour) preferably 1 to 2 v./v./hr. in a fixed bed unit and the hydrogen-containing recycle gas is recycled at the rate of about 2,000 to 12,000, preferably 6,000 cubic feet per barrel of feed. In the hydroforming process the recycle gas contains about 80 to 99% hydrogen by volume. In general, higher feed rates produce essentially the same yield of gasoline but the octane number and volatility are reduced appreciably.

Platinum-containing catalysts prepared by the above-described specific method when used in hydroforming give improved results at high pressures from about 500–1000 lbs. per square inch but they are especially effective at low pressures of the order of 50 to about 250 lbs. per square inch in view of their high stability toward regeneration.

The foregoing description contains a limited number of embodiments of the present invention. It will be understood that numerous variations are possible without departing from the scope of the following claims.

What is claimed is:

1. The method of preparing hydrocarbon conversion catalysts which comprises preparing an intermediate catalyst concentrate by impregnating a finely-divided, adsorptive solid oxide catalyst carrier with from about 1 to 35% by weight of a platinum group metal compound, drying this intermediate concentrate and mixing a minor proportion of the finely-divided concentrate particles with a major proportion of finely-divided, predried, adsorptive metal oxide containing a major proportion of alumina and which is free of platinum group metal to form a final catalyst composition containing the desired concentration of active platinum group metal catalyst component and in which the adsorptive metal oxide diluent cooperates with the intermediate catalyst concentrate particles in catalyzing said conversion.

2. The method according to claim 1 in which said solid oxide catalyst carrier is chosen from the group consisting of alumina, silica, magnesia, titania, zirconia, thoria and zinc oxide.

3. The method according to claim 1 in which the adsorptive metal oxide diluent is selected from the group consisting of alumina and alumina promoted with minor amounts of a solid oxide selected from the group consisting of silica, chromia, magnesia, titania, zirconia, thoria, boria and zinc oxide.

4. The method of preparing hydrocarbon conversion catalysts which comprises preparing an intermediate catalyst concentrate by impregnating finely-divided, adsorptive solid oxide catalyst carrier with from about 1 to 35% by weight of a water soluble platinum compound, drying said intermediate catalyst concentrate, intimately mixing a minor proportion of said intermediate catalyst concentrate with a major proportion of a platinum-free finely-divided, predried adsorptive metal oxide containing a major proportion of alumina to form a final catalyst composition containing the desired concentration of platinum.

5. The method according to claim 4 in which the platinum-free adsorptive metal oxide diluent is selected from the group consisting of alumina and alumina promoted with minor amounts of a solid oxide selected from the group consisting of silica, chromia, magnesia, titania, zirconia, thoria, boria and zinc oxide.

6. The method according to claim 4 in which the solid oxide catalyst carrier used to form the intermediate catalyst concentrate and the platinum-free metal oxide diluent are adsorptive alumina and the final catalyst composition contains from 0.01 to 1.0 wt. percent of platinum.

7. A catalyst for hydrocarbon conversions consisting of an intimate mixture of a minor proportion of finely divided adsorptive, solid oxide catalyst carrier particles containing from about 1% to 35% by weight of platinum and a major proportion of unplatinized, finely divided active alumina particles, the total catalyst mixture containing from about 0.01 to 1.0% by weight of platinum.

8. A catalyst according to claim 7 in which the platinum-containing adsorptive solid oxide catalyst carrier particles are active alumina.

9. A catalyst according to claim 7 in which the platinum-containing solid oxide catalyst carrier particles are active alumina and the unplatinized alumina particles are active alumina containing about 5% by weight of silica.

10. A catalyst for hydrocarbon conversions consisting of an intimate mixture of a minor proportion of finely divided, adsorptive solid oxide catalyst particles containing from about 1% to 35% by weight of platinum and a major proportion of unplatinized, finely divided active alumina, the total catalyst mixture containing from about 0.01 to 1.0% by weight of platinum and being shaped into the form of pills.

11. A catalyst for hydrocarbon conversions which consists of about 10 parts by weight of an intermediate catalyst concentrate consisting of about 5% by weight of platinum in the form of a platinum halide impregnated upon a finely divided active alumina intimately intermixed with about 90 parts by weight of a platinum-free finely divided active alumina containing from about 1 to 11% by weight of silica as a stabilizer, said mixture being heated and reduced with hydrogen to produce an active catalyst composition containing about 0.5% by weight of platinum.

12. A multiple function catalyst for hydrocarbon conversions consisting of an intimate mixture of a minor proportion of an intermediate catalyst concentrate consisting of finely divided solid oxide catalyst carrier particles containing from about 1% to 35% by weight of a platinum group metal compound and a major proportion of finely divided, adsorptive predried, metal oxide containing a major proportion of alumina diluent material which is essentially free of platinum group metal compound and wherein said platinum group metal-free metal oxide diluent material cooperates with said intermediate catalyst concentrate particles in catalyzing said conversion.

13. A catalyst according to claim 12 in which active alumina is used as the catalyst support in the intermediate catalyst concentrate as well as the alumina-containing diluent constituting the major proportion of the catalyst composition.

References Cited in the file of this patent

UNITED STATES PATENTS

| | | |
|---|---|---|
| 1,505,162 | Nowak | Aug. 19, 1924 |
| 1,672,768 | Miller et al. | June 5, 1928 |
| 2,184,235 | Groll et al. | Dec. 19, 1939 |
| 2,479,110 | Haensel | Aug. 16, 1949 |
| 2,535,948 | Nicholson et al. | Dec. 26, 1950 |
| 2,555,210 | Wadditt et al. | May 29, 1951 |
| 2,574,331 | Knox | Nov. 6, 1951 |
| 2,638,454 | Rowan | May 12, 1953 |

OTHER REFERENCES

Publication (Komarewsky et al.): "Catalytic Reforming of Gasoline," The Oil and Gas Journal, June 24, 1943, pp. 90–119.